(12) United States Patent
Dominique et al.

(10) Patent No.: US 7,734,308 B2
(45) Date of Patent: Jun. 8, 2010

(54) POWER REDUCTION METHODS IN ENHANCED TRANSMITTERS AND RECEIVERS

(75) Inventors: Francis Dominique, Rockaway, NJ (US); Shirish Nagaraj, Whippany, NJ (US); Hongwei Kong, Denville, NJ (US); Walid Elias Nabhane, Bedminster, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 694 days.

(21) Appl. No.: 11/645,606

(22) Filed: Dec. 27, 2006

(65) Prior Publication Data

US 2008/0159237 A1  Jul. 3, 2008

(51) Int. Cl.
H04B 7/00 (2006.01)

(52) U.S. Cl. .................. 455/522; 455/515; 455/67.7; 370/335

(58) Field of Classification Search ............. 455/522, 455/69, 420, 453, 13.4, 502, 504, 511, 515, 455/516, 552.1, 509, 550.1, 67.7; 370/335, 370/329, 278, 389, 473, 232, 431, 312
See application file for complete search history.

(56) References Cited

U.S. PATENT DOCUMENTS

| 7,024,602 | B2 | 4/2006 | Obuchi et al. | |
|---|---|---|---|---|
| 2004/0081097 | A1* | 4/2004 | Dominique et al. | 370/232 |
| 2004/0091067 | A1 | 5/2004 | Ammer et al. | |
| 2004/0095918 | A1 | 5/2004 | Dominique et al. | |
| 2004/0229639 | A1* | 11/2004 | Meyers et al. | 455/522 |
| 2005/0187995 | A1 | 8/2005 | Smolyar et al. | |
| 2006/0252452 | A1* | 11/2006 | Umesh et al. | 455/550.1 |
| 2007/0025345 | A1* | 2/2007 | Bachl et al. | 370/389 |
| 2007/0036104 | A1* | 2/2007 | Bachl et al. | 370/329 |
| 2007/0098115 | A1* | 5/2007 | Bachl et al. | 375/343 |
| 2007/0223404 | A1* | 9/2007 | Khan et al. | 370/278 |
| 2008/0043681 | A1* | 2/2008 | Vimpari et al. | 370/335 |

FOREIGN PATENT DOCUMENTS

| EP | 1592163 A | 11/2005 |
|---|---|---|
| WO | WO 2006/114689 | 11/2006 |

OTHER PUBLICATIONS

International Search Report and Written Opinion dated Jul. 24, 2008.
Technical Specification Group Radio Access Network: "3GPP TR 25.903 V1.2.0: Continuous Connectivity for Packet Data Users (Release 7)" Internet Citation, Nov. 1, 2006, XP002448298.
Lucent Technologies: "E-DPCCH Enhancement for VoIP, R1-050939", Internet Citation, Aug. 29, 2005, XP002478083.
Lucent Technologies: "E-DPCCH Enhancement for VoIP, R2-052495", Internet Citation, Oct. 10, 2005, XP002478082.
Universal Mobile Telecommunications System (UMTS): ETSI TS 125 212 V6.5.0: Mutliplexing and Channel Coding (FDD), Jun. 2005.

* cited by examiner

*Primary Examiner*—Tan Trinh
(74) *Attorney, Agent, or Firm*—Harness, Dickey & Pierce, P.L.C.

(57) ABSTRACT

Whether a receiver supports blind data channel detection is determined, and transmission of control channel information associated with a data channel is disabled if the determining step determines the receiver is capable of detecting the data channel without the use of control channel information. Data is transmitted to the receiver on the data channel without the control channel information after disabling of the transmission of the control channel information.

12 Claims, 7 Drawing Sheets

POWER REDUCTION METHODS IN ENHANCED TRANSMITTERS AND RECEIVERS

BACKGROUND OF THE INVENTION

Third generation (3G) wireless communication protocol standards (e.g., 3GPP-UMTS, 3GPP2-CDMA2000, etc.) may employ a dedicated traffic channel in the uplink (e.g., a communication flow between a mobile station (MS) or User Equipment (UE), hereinafter referred to as a user, and a base station (BS) or NodeB). The dedicated channel may include a data part (e.g., a dedicated physical data channel (DPDCH) in accordance with UMTS Release 4/5 protocols, a fundamental channel or supplemental channel in accordance with CDMA2000 protocols, etc.) and a control part (e.g., a dedicated physical control channel (DPCCH) in accordance with UMTS Release 4/5 protocols, a pilot/power control sub-channel in accordance with CDMA2000 protocols, etc.).

Newer versions of these standards, for example, Release 6 of UMTS provide for high data rate uplink channels referred to as enhanced dedicated channels (E-DCHs). An E-DCH may include an enhanced data part (e.g., an E-DCH dedicated physical data channel (E-DPDCH) in accordance with UMTS protocols) and an enhanced control part (e.g., an E-DCH dedicated physical control channel (E-DPCCH) in accordance with UMTS protocols).

FIG. 1 illustrates a conventional wireless communication system 100 operating in accordance with UMTS protocols. Referring to FIG. 1, the wireless communication system 100 may include a number of NodeBs such as NodeBs 120, 122 and 124, each serving the communication needs of a first type of user 110 and a second type of user 105 in their respective coverage area. The first type of user 110 may be a higher data rate user such as a UMTS Release 6 user, referred to hereinafter as an enhanced user. The second type of user may be a lower data rate user such as a UMTS Release 4/5 user, referred to hereinafter as a legacy user. The NodeBs are connected to an RNC such as RNCs 130 and 132, and the RNCs are connected to a MSC/SGSN 140.

The RNC handles certain call and data handling functions, such as, autonomously managing handovers without involving MSCs and SGSNs. The RNC also manages UE and NodeB capabilities, such as, transmitter and receiver capabilities. This may include, for example, determining whether a particular user is an enhanced user or a legacy user. The MSC/SGSN 140 handles routing calls and/or data to other elements (e.g., RNCs 130/132 and NodeBs 120/122/124) in the network or to an external network. Further illustrated in FIG. 1 are interfaces Uu, Iub, Iur and Iu between these elements.

FIG. 2 illustrates an example frame structure for the E-DCHs (e.g., E-DPCCH and E-DPDCH) in the uplink direction.

Referring to FIG. 2, each frame 200 may have a length of, for example, 10 milliseconds (ms) and may be partitioned into 5 sub-frames each including 3 slots. Each slot 205 may have a length of, for example, 2560 chips, and may have a duration of, for example, 2/3 ms. Consequently, each sub-frame may have a duration of 2 ms. As discussed above, an E-DCH includes an E-DPDCH 240 and an E-DPCCH 220, and each of the E-DPCCH 220 and the E-DPDCH 240 may be code multiplexed.

The E-DPCCH 220 carries control information for an associated E-DPDCH 240. This control information includes three components: a re-transmission sequence number (RSN), a transport format indicator (TFI) and a happy bit. The RSN may comprise 2 bits, the TFI may comprise 7 bits and the happy bit may comprise 1 bit. These components are well-known in the art, and therefore, a detailed discussion will be omitted for the sake of brevity.

FIG. 3 illustrates a conventional UMTS uplink transmitter 300 located, for example, at the enhanced UE 110 of FIG. 1 and a receiver 350 located at one of the NodeBs 120/122/124. The conventional transmitter 300 and receiver 350 of FIG. 3 may transmit and receive E-DCHs, respectively.

As shown in FIG. 3, data associated with an upper layer enhanced dedicated transport channel (E-DTrCH) may be processed into E-DPDCH frames at the transmission channel processing block 303. The frames may be binary phase shift keying (BPSK) modulated and orthogonally spread at the modulation and orthogonal spreading unit 304. The spread modulated frames are received by the gain unit 315 where an amplitude of the spread modulated frames may be adjusted. A combiner 320 receives the output of the gain unit 315.

Still referring to FIG. 3, the 2 RSN bits, the 7 TFI bits and the 1 happy bit are mapped into a 10-bit E-DPCCH word, which may be control information for an associated E-DPDCH frame having a TTI of, for example, 2 ms or 10 ms.

The 10-bit E-DPCCH word includes a happy bit set to a given value (e.g., '1' or '0'), a format indicator or TFI having a value corresponding to a data format for the transport channel carried by the associated E-DPDCH frame (e.g., transport block size, transmission time interval (TTI), etc.), and an RSN value between 0 and 3. The happy bit and the TFI may be referred to as control data.

The 10-bit E-DPCCH word may then be coded into a 30-bit coded sequence at an FEC unit 301. The 30-bit coded sequence is modulated at a BPSK Modulator 305 and orthogonally spread at an orthogonal spreading unit 310. The output from the orthogonal spreading unit 310 is gain adjusted at a gain unit 316 and output to the combiner 320.

Similar to the above E-DPCCH, well-known DPCCH frames used in determining, for example, channel estimates, are modulated at a BPSK Modulator 306, and the modulated frames are orthogonally spread at an orthogonal spreading unit 311. The spread modulated frames are received by a gain unit 317 where an amplitude of the spread modulated frames may be adjusted.

The outputs of each of the gain units 315, 316 and 317 are complex signals and are combined (e.g., code-division and/or I/Q multiplexed) into a combined signal by a combiner unit 320. The combined signal is scrambled and filtered by a shaping filter 325, and the output of the shaping filter 325 is sent to the receiver 350 via a propagation channel 330 (e.g., over the air).

After the transmitter 300 transmits the combined signal over the propagation channel 330, the transmitting UE awaits an ACK from the NodeB indicating that the transmitted signal has been successfully received and decoded.

If an ACK is received by the user, the transmitter 300 may transmit new E-DTrCH data. If an ACK is not received or an NACK is received, the UE may retransmit the same TrCh packet and similar control information via an E-DPDCH frame and corresponding E-DPCCH frame, respectively.

After retransmitting the data and associated control information (e.g., via an E-DPDCH frame and a corresponding E-DPCCH frame, respectively), if still no ACK is received from the NodeB or a NACK is received, the UE may retransmit the data and similar control information again via another E-DPDCH frame and E-DPCCH frame, respectively. The UE may continue to retransmit the non-acknowledged data until an ACK is received, or the number of re-transmissions reaches a threshold value.

At the receiver 350, the transmitted signal is received over the propagation channel 330, and input to the E-DPDCH processing block 335, E-DPCCH soft-symbol generation block 345 and a DPCCH channel estimation block 355. As is well-known in the art, the DPCCH channel estimation block 355 generates channel estimates using pilots transmitted on the DPCCH. The channel estimates may be generated in any well-known manner, and will not be discussed further herein for the sake of brevity. The channel estimates generated in the DPCCH channel estimation block 355 may be output to each of the E-DPDCH processing block 335 and the E-DPCCH soft-symbol generation block 345.

At the soft-symbol generation block 345, the received control signal may be de-scrambled, de-spread, and de-rotated/de-multiplexed to generate a sequence of soft-symbols. The E-DPCCH soft-symbols may represent an estimate of the received signal, or in other words, an estimate of the 30 symbols transmitted by the transmitter 300. The E-DPCCH soft-symbols may be further processed to recover the transmitted E-DPCCH word.

The E-DPCCH soft-symbols are output to an E-DPCCH discontinuous transmission (DTX) detection unit 365. The E-DPCCH DTX detection unit 365 determines whether the signal received on the E-DPCCH actually includes control information using a thresholding operation.

For example, the E-DPCCH DTX detection unit 365 may normalize a signal energy for a received E-DPCCH frame (e.g., the signal energy over a given TTI of 2 ms) and compare the normalized signal energy to a threshold. If the normalized signal energy is larger than the threshold, the E-DPCCH DTX detection unit 365 determines that a control signal is present on the E-DPCCH; otherwise, the E-DPCCH DTX detection unit 365 determines that a control signal is not present on the E-DPCCH and, subsequently, declares a discontinuous transmission.

If the E-DPCCH DTX detection unit 365 detects that a control signal is present on the E-DPCCH, the soft-symbols output from the soft-symbol generation block 345 are processed by the E-DPCCH decoding block 375 to recover (e.g., estimate) the 10-bit E-DPCCH word transmitted by the transmitter 300.

For example, in recovering the transmitted 10-bit E-DPCCH word, the E-DPCCH decoding block 375 may determine a correlation value or correlation distance, hereinafter referred to as a correlation, between the sequence of soft-symbols and each 30-bit codeword in a subset (e.g., 2, 4, 8, 16, 32, etc.) of all 1024 possible E-DPCCH codewords that may have been transmitted by the transmitter 300. This subset of codewords may be referred to as a codebook.

After determining a correlation between the sequence of soft-symbols and each of the codewords in the codebook, the E-DPCCH decoding block 375 selects the 10-bit E-DPCCH word corresponding to the 30-bit E-DPCCH codeword, which has the highest correlation to the E-DPCCH soft-symbols. The 10-bit E-DPCCH word is then output to the E-DPDCH processing block 335 for use in processing the E-DPDCH.

If the E-DPDCH is successfully received and decoded at the receiver 350, the NodeB transmits an ACK to the transmitting UE in the downlink; otherwise, the NodeB transmits a NACK (e.g., if the NodeB is a serving NodeB) or nothing (e.g., if the NodeB is a non-serving NodeB).

In the above description, TrCh packet data is detected and decoded using associated control information. However, some enhanced receivers may perform blind detection of E-DPDCH frames carrying TrCh packet data, without the use of corresponding control information normally transmitted in an associated E-DPCCH frame. Some methods for blind detection include single-frame complete decoding, blind (multi-frame) E-DPDCH detection without the need of E-DPCCH, MAP (multi-frame) decoding of E-DPCCH with E-DPCCH power de-boosting, ML (multi-frame) decoding of E-DPCCH, E-DPDCH-assisted ML (multi-frame) decoding of E-DPCCH, self-assisted ML (multi-frame) decoding of E-DPCCH and hybrid ML and decision-directed (multi-frame) decoding of E-DPCCH.

These above methods are used in conjunction with the current E-DCH format defined in Release 6 standards. However, these methods may result in unnecessary processing burdens at the NodeB and/or UE because even during blind detection, transmitters and receivers may unnecessarily process control channel information. For example, in the uplink, when the UE is no longer transmitting control information on the E-DPCCH, the NodeB may continue to process the E-DPCCH.

SUMMARY OF THE INVENTION

At least one example embodiment provides a method for power reduction at a transmitter. In this method, the transmitter may determine whether a receiver supports detecting a data channel without the use of control channel information. The transmitter may disable transmission of control channel information associated with the data channel if the receiver is capable of detecting the data channel without the use of control channel information. Data may be transmitted to the receiver on the data channel without the control channel information.

According to at least this example embodiment, a discontinue indicator may be transmitted to the receiver. The discontinue indicator may indicate that transmission of the control channel information has been disabled. To disable transmission of the control channel information, the transmitter may turn off the control channel if the receiver supports blind data channel detection. Alternatively, the transmitter may transmit discontinuous transmission frames in place of the control channel information. If the receiver is incapable of detecting the data channel without the use of control channel information, the control channel information may be transmitted by the transmitter.

According to at least this example embodiment, after the transmission power of the control channel information is disabled, the transmitter may determine whether transmission power conservation is necessary. If transmission power conservation is determined to be unnecessary, the transmitter may enable transmission of control channel information. The transmitter may transmit the data on the data channel and the control information on the control channel to the receiver. The transmitter may also transmit a control channel transmission indicator to the receiver. The control channel transmission indicator may indicate that transmission of the control channel information has been enabled. In this example, on the control channel may be turned on if transmission power conservation is determined to be unnecessary.

At least one other example embodiment provides a method for power reduction at a receiver. In this method, the receiver may disable processing of the control channel information in response to a received discontinue indicator. The received discontinue indicator may indicate transmission of the control channel information has been disabled at the transmitter. The receiver may detect the data channel without the use of the control channel information.

According to at least this example embodiment, the discontinue indicator may indicate a control channel for carrying the control channel information is carrying discontinuous transmission frames. Alternatively, the discontinue indicator may indicate that a control channel for carrying the control channel information has been turned off at a transmitter.

The receiver may enable processing of the control channel information in response to a received control channel transmission indicator. The received control channel transmission indicator may indicate that transmission of the control channel information has been enabled at the transmitter.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Although the following description relates to a communication network or system based on CDMA technologies such as WCDMA/UMTS, and will be described in this example context with respect to FIG. 1, it should be noted that the example embodiments shown and described herein are meant to be illustrative only and not limiting in any way. For example, methods and/or apparatuses according to example embodiments of the present invention may be utilized in conjunction with any wireless technology, such as, IS95, cdma2000, similar and/or related technologies. Various modifications to example embodiments of the present invention will be apparent to those skilled in the art for application to communication systems or networks based on technologies other than the above, which may be in various stages of development and intended for future replacement of, or use with, the above networks or systems.

Example embodiments of the present invention may be implemented using a processor such as a digital signal processor (DSP) or application specific integrated circuit (ASIC). Alternatively, example embodiments of the present invention may be implemented at least in part in the form of a computer software program stored in a memory or external storage device. Such a program may be executed, for example, by a processor. The processor used to implement and/or execute at least some example embodiments of the present invention may be one of a plurality of processors included at a conventional NodeB and/or UE such as NodeB 120 and/or UE 110 of FIG. 1.

Figure 1:
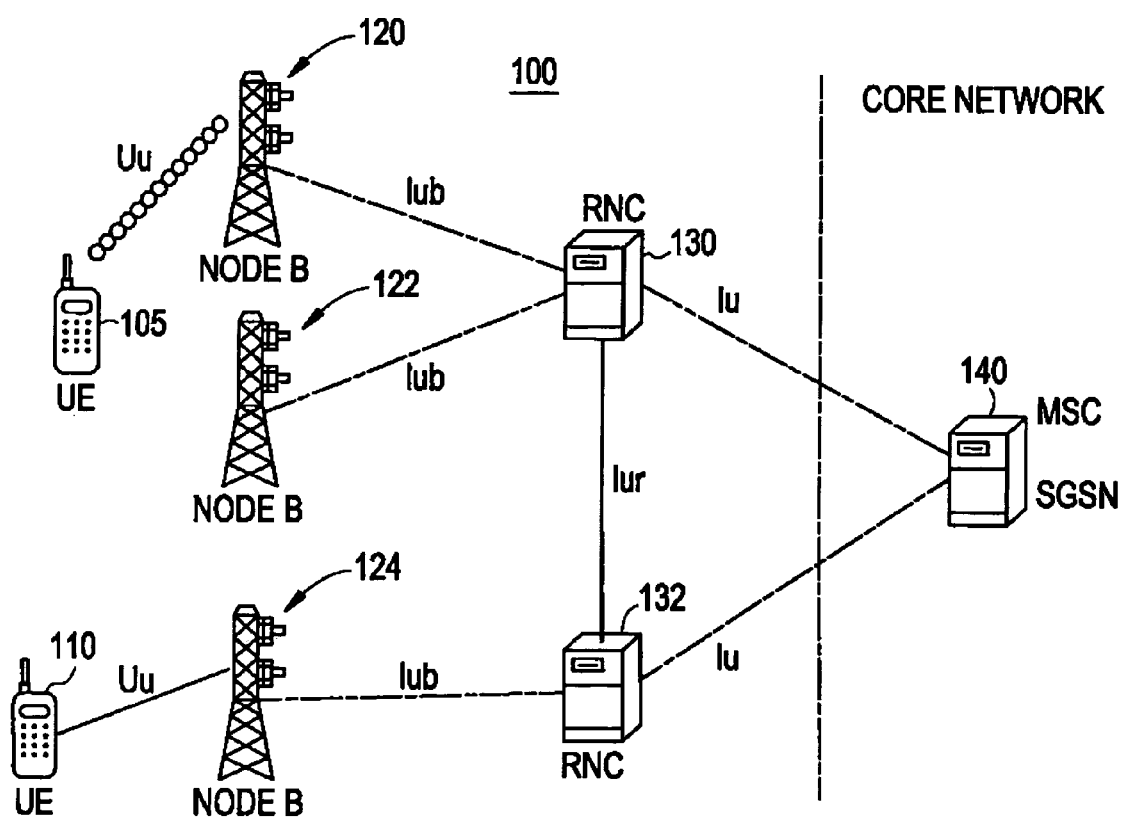
FIG. 1 illustrates a conventional wireless communication system operating in accordance with UMTS protocols.
Figure 2:
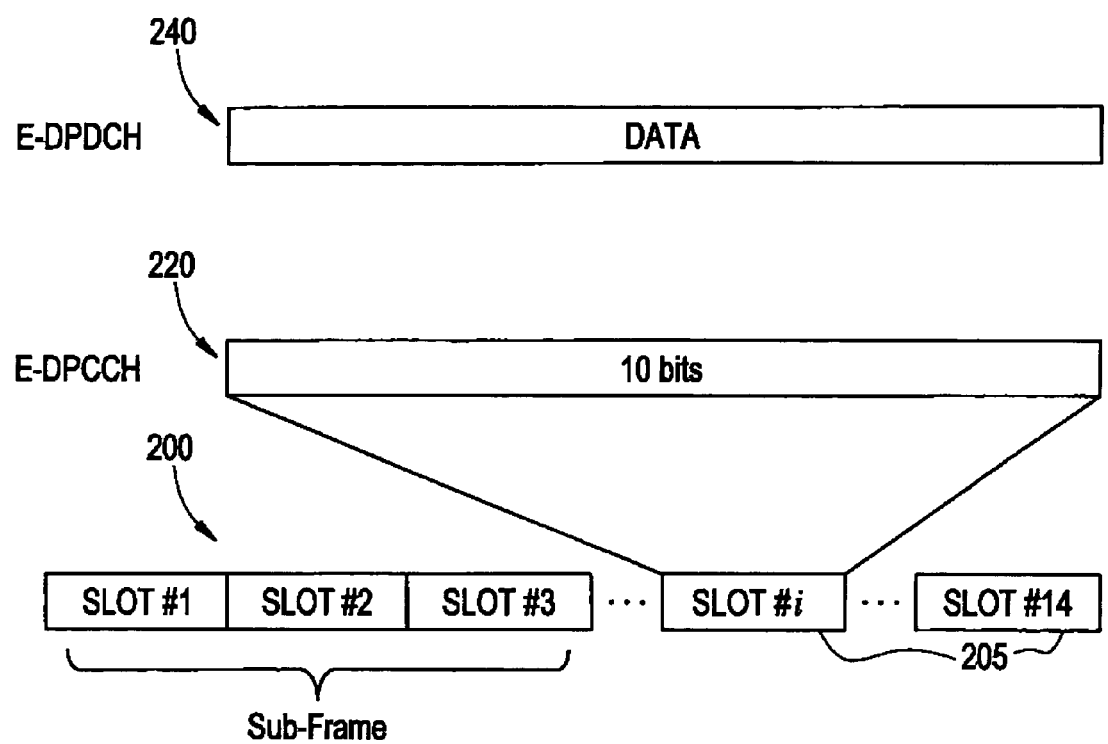
FIG. 2 illustrates an example of a conventional frame structure of enhanced uplink dedicated physical channels.

Referring to FIG. 1, when a user, such as UE 110 is switched on (e.g., is powered on) or enters a coverage area or cell of a NodeB, such as NodeB 120, UE 110 may inform the NodeB 120 and the RNC 130 of the user's capabilities via higher level signaling. Methods for doing so are well known in the art. For example, UE 110 may indicate whether UE 110 is a legacy user or an enhanced user, what type of transmitter and/or receiver is included at UE 110, whether UE 110 supports transmission of the E-DPDCH without transmission of corresponding control information on the E-DPCCH, etc. In the same way, when the NodeB 120 is added to the RNC the NodeB 120 communicates all its capabilities to the RNC. Methods for doing so are well known in the art. Thus, the RNC 130 may have knowledge of analogous capabilities of both the UE 110 and the NodeB 120 concurrently.

If the NodeB 120 supports blind detection of data transmitted on the E-DPDCH (herein after referred to as blind E-DPDCH detection), associated control information (e.g., a happy bit, an RSN and the TFI) carried by the E-DPCCH may not be needed to receive, decode and recover TrCh packet data received on the E-DPDCH.

Figure 4:
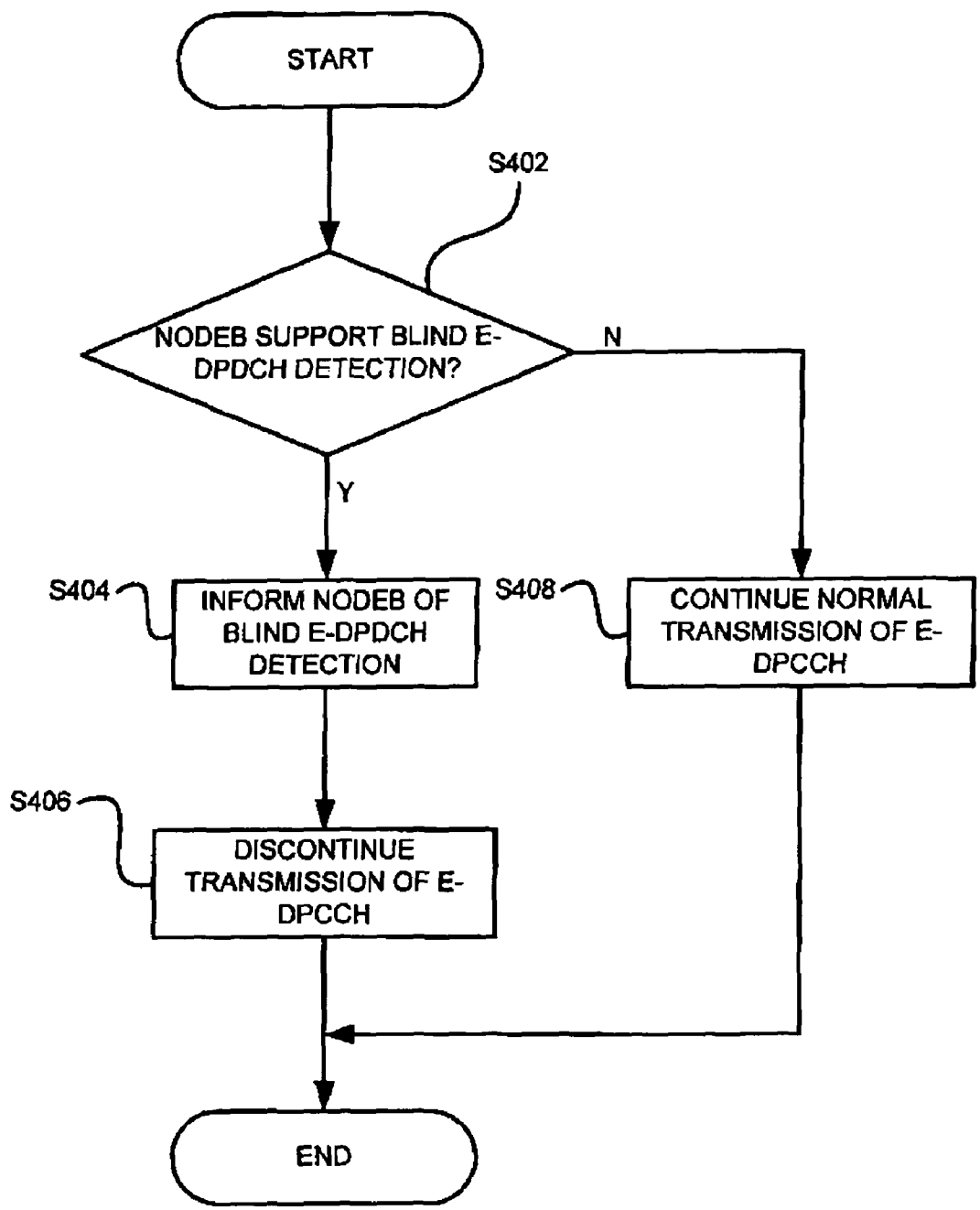
FIG. 4 is a flow chart illustrating a method for power reduction in a wireless communication system, according to an example embodiment of the present invention.

FIG. 4 is a flow chart illustrating a method for power reduction, according to an example embodiment of the present invention. The method shown in FIG. 4 may be performed by the uplink transmitter at a UE, and will be described with regard to UE 110 of FIG. 1. However, this method may also be applied at a down-link transmitter at a NodeB in the same or substantially the same manner. When utilized, at least this example embodiment may reduce processing and/or transmission power at the UE and/or the NodeB.

Referring to FIG. 4, after receiving an indication of the receiving capabilities of the NodeB 120, for example in a call setup message from the NodeB 120, the UE 110 may determine whether the NodeB 120 supports blind E-DPDCH detection based on the determined receiving capabilities of the NodeB 120, at step S402. If the NodeB 120 supports blind E-DPDCH detection, the UE 110 may inform the NodeB 120 that the UE 110 intends to discontinue or disable transmission of control information on the E-DPCCH at S404. The UE 110 may desire to conserve transmission power, for example, to transmit higher data rates. Transmission power may need to be conserved in this case because the total transmission power of the UE 110 is limited to a maximum value, and thus, the transmission power allocated for transmitting the E-DPCCH may limit the amount of power available to the E-DPDCH). In another example, the UE 110 may desire to conserve transmission power when using a fixed data rate and targeting a lower number of retransmissions, for example, when using a voice application. The UE 110 may inform the NodeB 120 of these intentions via an RACH message, control information transmitted as part of the legacy DPCH channel or any other suitable signaling channel.

At step S406, the UE 110 may discontinue or disable processing and/or transmitting control information on the E-DPCCH thereby conserving processing and/or transmission power at the UE 110. Alternatively, the UE 110 may transmit only DTX frames to the NodeB 120. That is, for example, the transmitted E-DPCCH frames may not contain any actual control information and may have a transmission power (e.g., gain) of zero. For example, each transmitted E-DPCCH frame may include all zeros. Methods for transmitting DTX frames are well-known in the art, and therefore, a further and more detailed discussion will be omitted for the sake of brevity.

Figure 3:
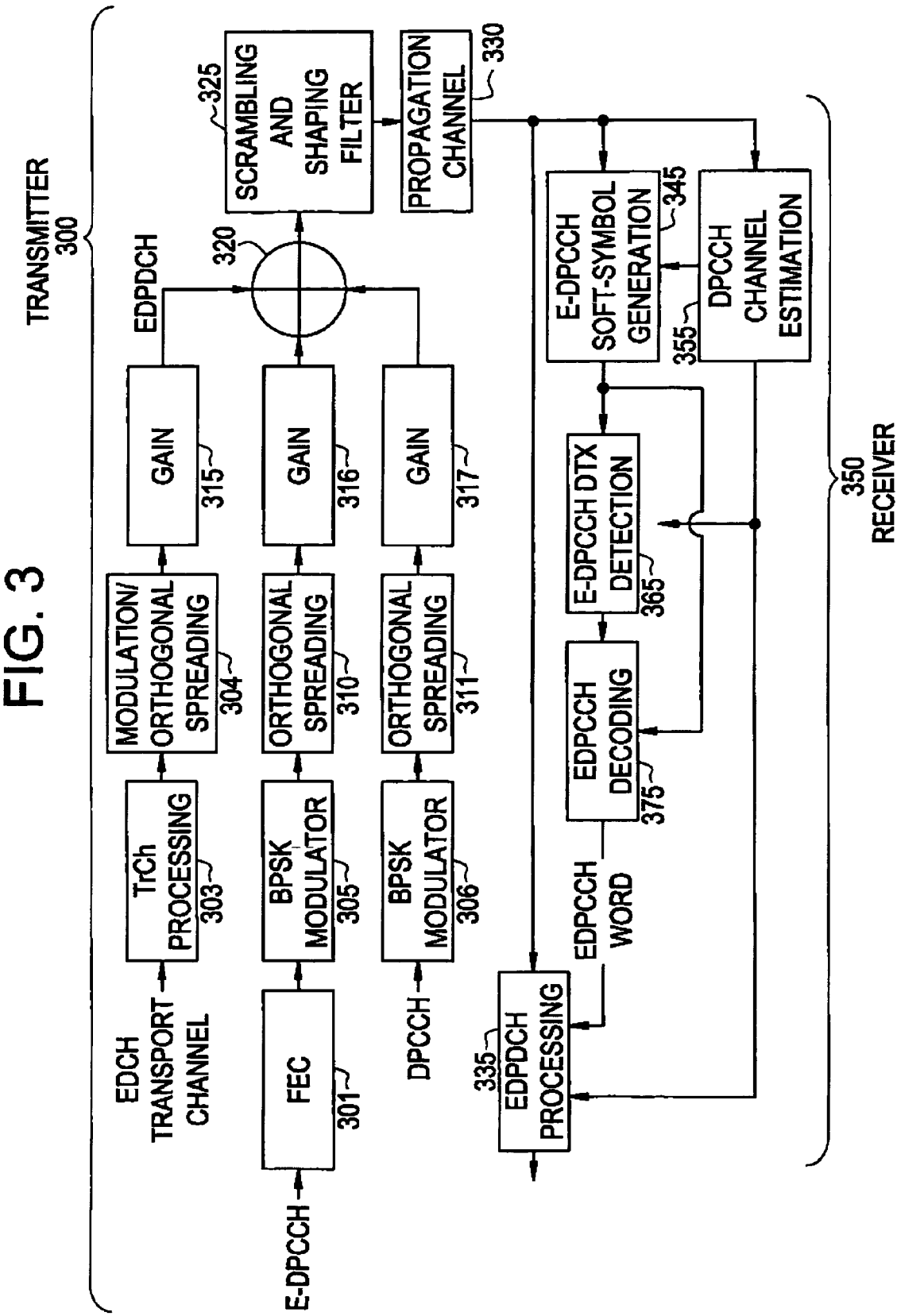
FIG. 3 illustrates a conventional UMTS uplink transmitter and receiver.

Returning to step S402 of FIG. 4, if the UE 110 determines that the NodeB 120 does not support blind E-DPDCH detection, the UE 110 may continue normal transmission of TrCh packet data and corresponding control information on the E-DPDCH and corresponding E-DPCCH, respectively, as described above with respect to FIG. 3.

Figure 5:
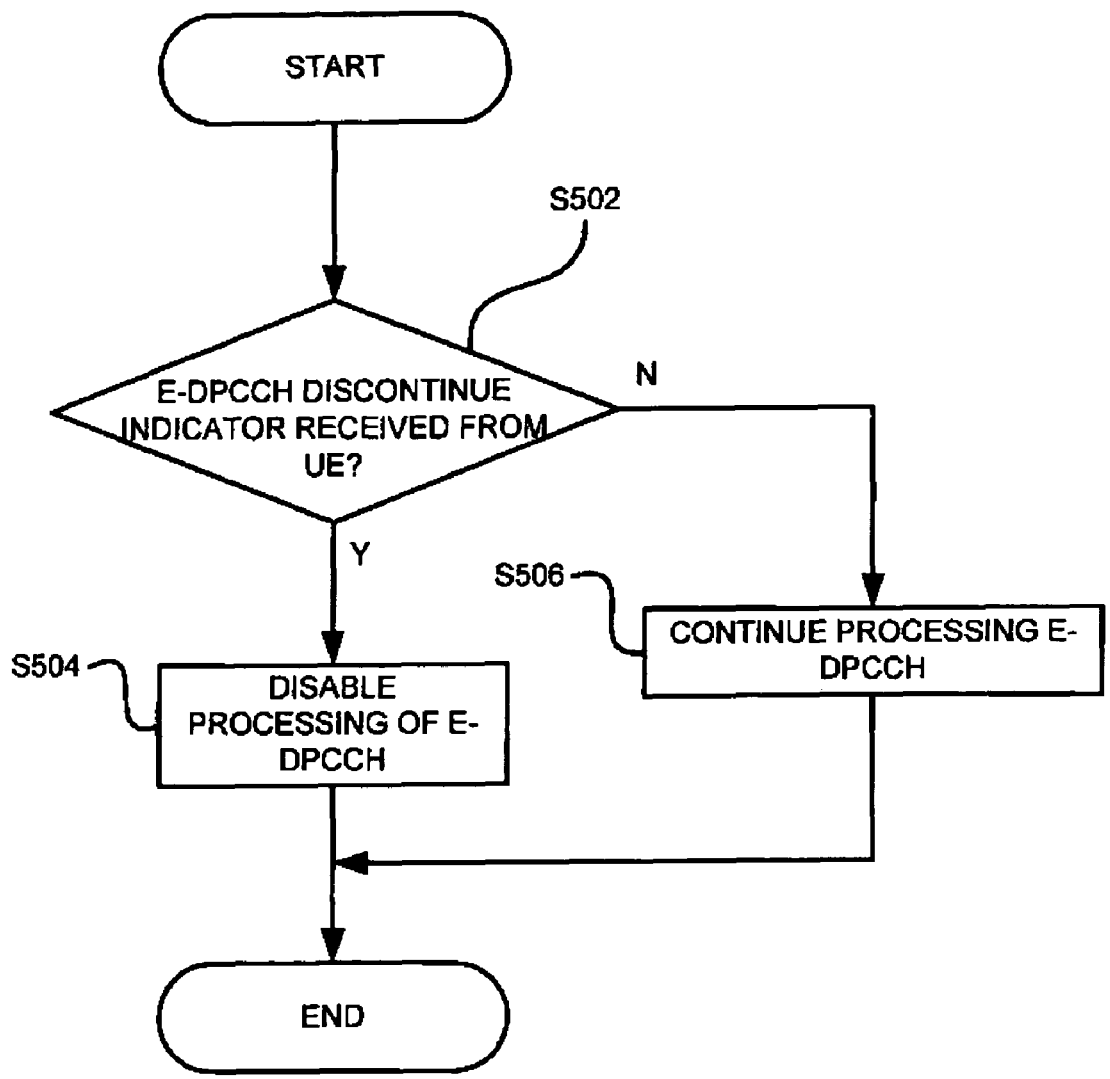
FIG. 5 is a flow chart illustrating a method for power reduction in a wireless communication system, according to another example embodiment of the present invention.

FIG. 5 is a flow chart illustrating a method for power reduction in a wireless communication system, according to another example embodiment. The method of FIG. 5 may be performed at an uplink receiver located at a NodeB, and will be described with regard to NodeB 120 shown in FIG. 1. However, this method may be applied to down-link receivers located at a UE, in the same or substantially the same manner.

Referring to FIG. 5, after receiving an indication of the transmission capabilities of the UE 110 from the RNC 130 and/or the UE 110 itself, the NodeB 120 may check whether an E-DPCCH discontinue indicator has been received from the UE 110, at step S502. The E-DPCCH discontinue indicator may indicate that the UE 110 has, or intends to, discontinue and/or disable processing and/or transmission of the E-DPCCH. That is, for example, the UE 110 has or intends to stop transmission of the E-DPCCH.

Alternatively, the E-DPCCH discontinue indicator may indicate that the UE 110 is transmitting only DTX frames on the E-DPCCH. The E-DPCCH discontinue indicator may be transmitted over any suitable signaling channel in any well-known manner, for example, in the form of a flag bit. Whether the discontinue indicator indicates discontinuing of the E-DPCCH or transmission of DTX frames may be determined at the NodeB 120 based on the capabilities of the UE 110. In another example embodiment, the RNC 130 may send the E-DPCCH discontinue indicator to the NodeB 120 after receiving the transmission capabilities of the UE 110 based on, for example, network conditions.

Referring still to FIG. 5, if an E-DPCCH discontinue indicator has been received from the UE 110, the NodeB 120 may discontinue processing the uplink E-DPCCH between UE 110 and the NodeB 120, and perform blind detection of E-DPDCH data, at step S504.

As discussed above, the UE 110 may transmit DTX E-DPCCH frames when the NodeB 120 uses blind E-DPDCH detection. By signaling that DTX E-DPCCH frames are to be transmitted to the NodeB 120, the NodeB 120 need not continue processing the E-DPCCH as discussed above with regard to FIG. 4.

Returning to step S502 of FIG. 5, if the NodeB 120 has not received an E-DPCCH discontinue indicator, the NodeB 120 may continue processing the E-DPCCH and E-DPDCH as described above with respect to FIG. 3.

Figure 6:
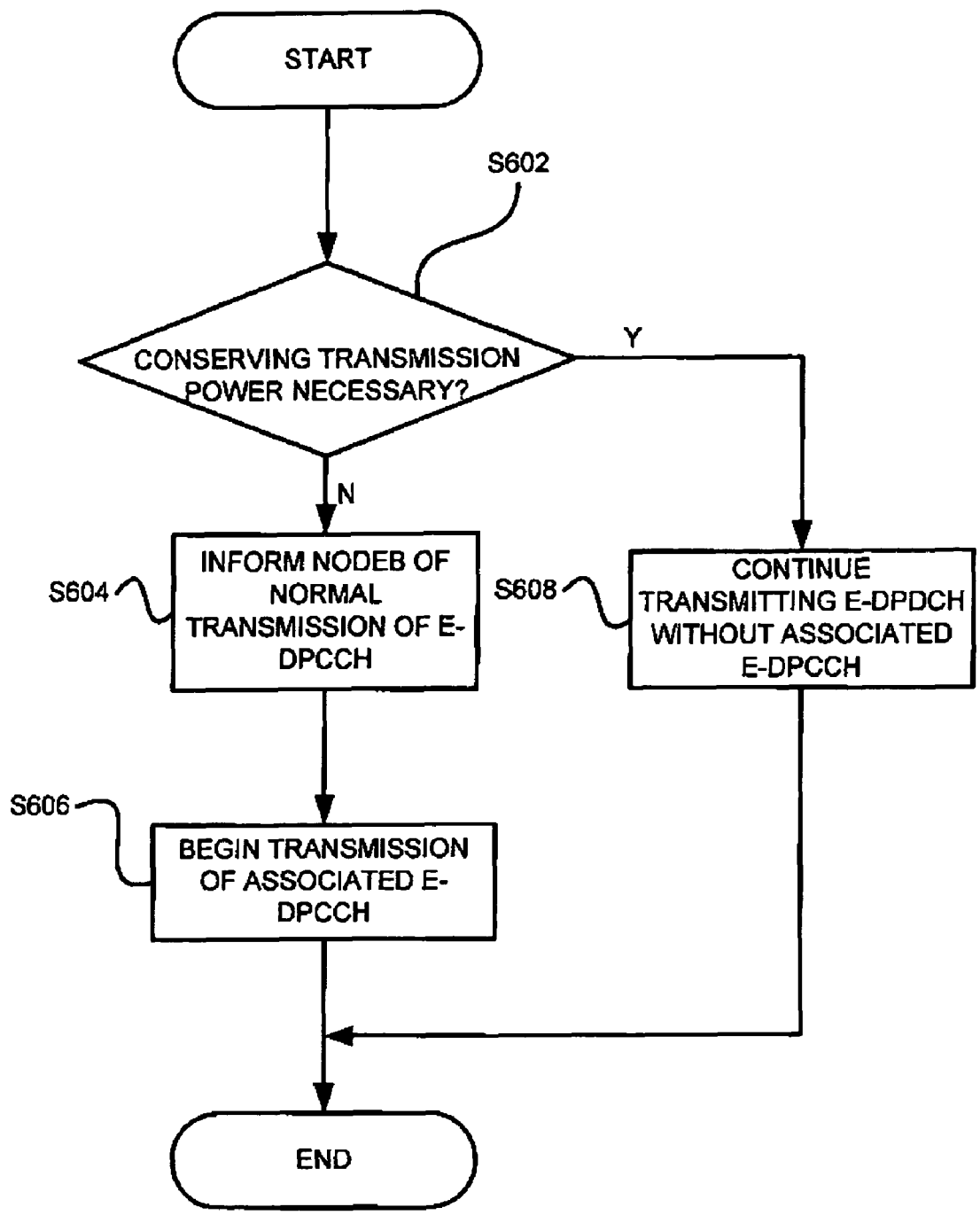
FIG. 6 is a flow chart illustrating another method, according to an example embodiment of the present invention.

FIG. 6 is a flow chart illustrating a method, according to another example embodiment of the present invention. When employing blind E-DPDCH detection, the UE 110 may desire to begin transmitting control information on the associated E-DPCCH, for example, because of an application change (e.g., reconfiguration) and/or due to poor (e.g., very poor) blind detection performance leading to many RRC layer retransmissions. In this example, the UE 110 may transmit a control channel transmission indicator to the NodeB 120. The control channel transmission indicator may be the same or different from the discontinue indicator. That is, for example, the control channel transmission indicator may be the discontinue indicator having a value opposite to the value used to indicate discontinuing of the control channel transmission described above with regard to FIG. 4. After transmitting the control channel transmission indicator, the UE 110 may begin transmitting control information on the E-DPCCH. The method shown in FIG. 6 may be performed by the uplink transmitter at a UE, and will be described with regard to UE 110 of FIG. 1. However, this method may also be applied at a downlink transmitter at a NodeB in the same or substantially the same manner.

Referring to FIG. 6, at step S602, the UE 110 may determine whether transmission power conservation is still necessary and/or desirable. For example, the UE 110 may determine that transmission power conservation is no longer necessary because of an application change (e.g., reconfiguration) and/or due to poor (e.g., very poor) blind detection performance leading to many RRC layer retransmissions. If the UE 110 determines that power conservation is no longer necessary, the UE 110 may inform the NodeB 120 that the UE 110 intends to enable or re-enable transmission of control information on the E-DPCCH. The UE 110 may inform the NodeB 120 of these intentions via any suitable signaling channel. The signaling channel may be the same signaling channel used to indicate blind E-DPDCH detection described above with regard to FIG. 4.

At step S606, the UE 110 may enable or re-enable processing and/or transmitting control information on the E-DPCCH. That is, for example, the transmitted E-DPCCH frames may contain actual control information and may not have a transmission power (e.g., gain) of zero, as described above, when the control channel frames are DTXed. Returning to step S602, if the UE 110 determines that power conservation is still necessary, the UE 110 may continue to transmit TrCh packet data without corresponding control information on the E-DPDCH and corresponding E-DPCCH.

Although FIG. 6 shows only a single iteration of the method, this process may be performed, for example, periodically with the period being determined by empirical data, and/or set by a network administrator.

Figure 7:
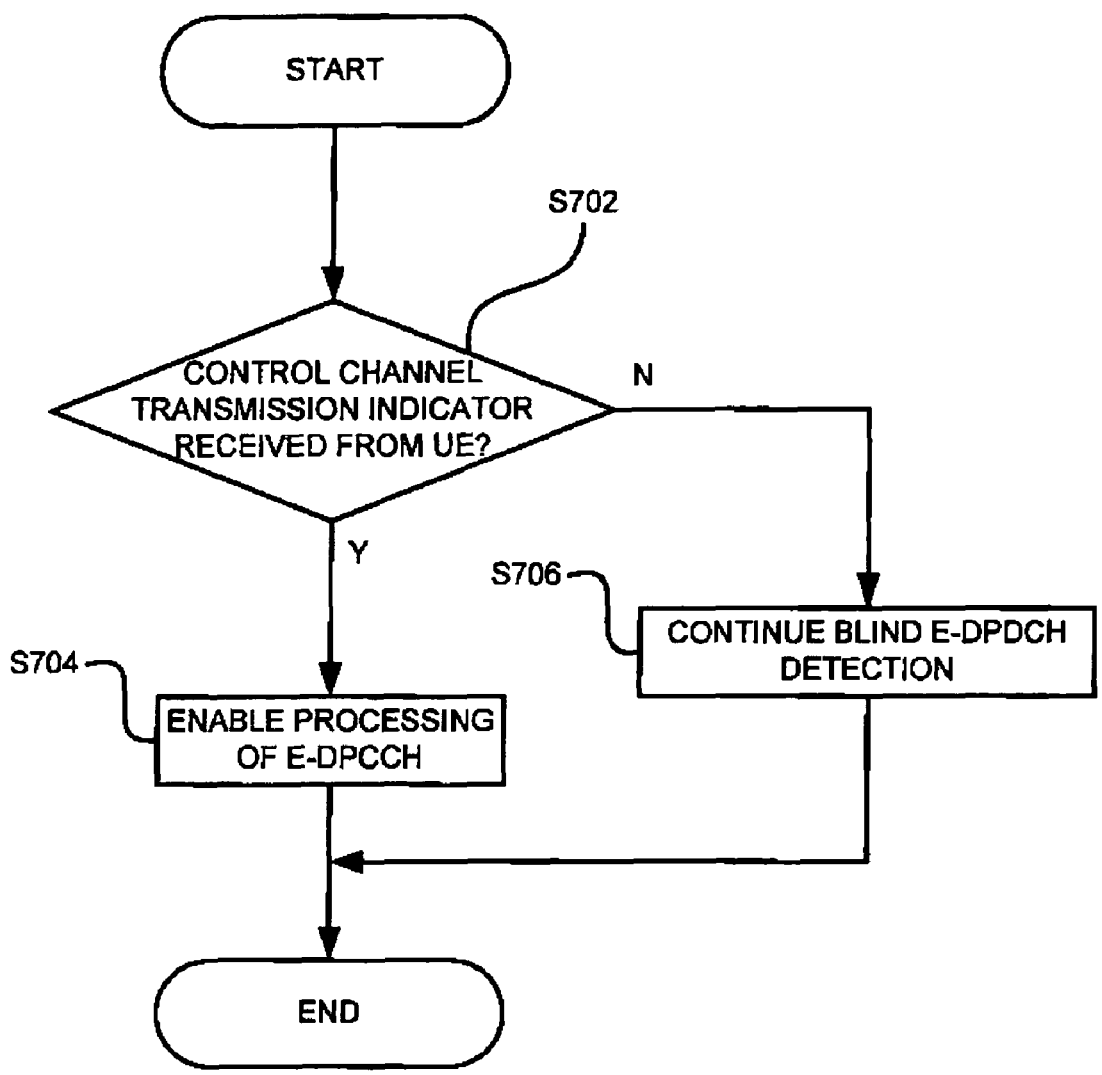
FIG. 7 is a flow chart illustrating a method, according to another example embodiment of the present invention.

FIG. 7 is a flow chart illustrating a method, according to another example embodiment of the present invention. The method of FIG. 7 may be performed at an uplink receiver located at a NodeB, and will be described with regard to NodeB 120 shown in FIG. 1. However, this method may be applied to down-link receivers located at a UE, in the same or substantially the same manner.

Referring to FIG. 7, while employing blind E-DPDCH detection, the NodeB 120 may check whether a control channel transmission indicator has been received from the UE 110, at step S702. The control channel transmission indicator may indicate that the UE 110 has, or intends to, enable or re-enable processing and/or transmission of the E-DPCCH. That is, for example, the UE 110 has or intends to transmit packets including actual control information on the E-DPCCH. The control channel transmission indicator may be the same as that described above with regard to FIG. 6.

Referring still to FIG. 7, if a control channel transmission indicator has been received from the UE 110, the NodeB 120 may enable or re-enable processing the uplink E-DPCCH between UE 110 and the NodeB 120, and perform normal detection of E-DPDCH data using associated control information received on the E-DPCCH, at step S704.

Returning to step S702 of FIG. 7, if the NodeB 120 has not received control channel transmission indicator, the NodeB 120 may continue blind E-DPDCH detection.

Although FIG. 7 shows only a single iteration of the method, this process may be performed, for example, periodically with the period being determined by empirical data, and/or set by a network administrator.

Although FIGS. 4 and 6 are described separately, the methods shown therein may be used in combination with one another. For example, the method of FIG. 4 may be used to transition from normal E-DPDCH detection to blind E-DPDCH detection when the UE 110 desires to conserve transmission power for a period of time. When the UE 110 determines conserving transmission power is no longer necessary, the method of FIG. 6 may be employed to transition from blind E-DPDCH detection to normal E-DPDCH detection.

Although FIGS. 5 and 7 are described separately, the methods shown therein may be used in combination with one another. For example, the method of FIG. 5 may be used to transition from normal E-DPDCH detection to blind E-DPDCH detection in response to a E-DPCCH discontinue indicator from the UE 110, and the method of FIG. 7 may be employed to transition from blind E-DPDCH detection to normal E-DPDCH detection in response to a control channel transmission indicator from the UE 110.

The invention being thus described, it will be obvious that the same may be varied in many ways. Such variations are not to be regarded as a departure from the invention, and all such modifications are intended to be included within the scope of the invention.

We claim:

1. A method for power reduction at a transmitter, the method comprising:
   determining, at the transmitter, whether a receiver supports detecting a data channel without the use of control channel information;
   disabling transmission of control channel information associated with the data channel if the determining step determines the receiver is capable of detecting the data channel without the use of control channel information; and
   transmitting data to the receiver on the data channel without the control channel information.

2. The method of claim 1, further comprising:
   transmitting a discontinue indicator to the receiver, the discontinue indicator indicating that transmission of the control channel information has been disabled.

3. The method of claim 1, wherein the disabling step comprises:
   turning off the control channel if the determining step determines the receiver supports blind data channel detection.

4. The method of claim 1, wherein the disabling step comprises:
   transmitting discontinuous transmission frames in place of the control channel information.

5. The method of claim 1, further comprising:
   transmitting control channel information associated with a data channel if the determining step determines the receiver is incapable of detecting the data channel without the use of control channel information.

6. The method of claim 1, after the transmission of the control channel information is disabled, further comprising:
   determining whether transmission power conservation is necessary;
   enabling transmission of control channel information if transmission power conservation is determined to be unnecessary; and
   transmitting, to the receiver, data on the data channel and the control information on the control channel.

7. The method of claim 6, further comprising:
   transmitting a control channel transmission indicator to the receiver, the control channel transmission indicator indicating that transmission of the control channel information has been enabled.

8. The method of claim 6, wherein the enabling step comprises:
   turning on the control channel if transmission power conservation is determined to be unnecessary.

9. A method for power reduction at a receiver, the method comprising:
   disabling, at the receiver, processing of control channel information associated with a received data channel in response to a received discontinue indicator, the received discontinue indicator indicating transmission of the control channel information has been disabled; and
   detecting the data channel at the receiver without the use of the control channel information.

10. The method of claim 9, wherein the discontinue indicator indicates a control channel for carrying the control channel information is carrying DTX frames.

11. The method of claim 9, wherein the discontinue indicator indicates that a control channel for carrying the control channel information has been turned off at a transmitter.

12. The method of claim 9, further comprising:
    enabling processing of the control channel information associated with the data channel in response to a received control channel transmission indicator, the received control channel transmission indicator indicating transmission of the control channel information has been enabled.

* * * * *